(12) United States Patent
Gogic

(10) Patent No.: US 9,137,745 B2
(45) Date of Patent: Sep. 15, 2015

(54) SYSTEM AND METHOD TO LOCATE FEMTO CELLS WITH PASSIVE ASSISTANCE FROM A MACRO CELLULAR WIRELESS NETWORK

(75) Inventor: Aleksandar M. Gogic, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 766 days.

(21) Appl. No.: 12/248,247

(22) Filed: Oct. 9, 2008

(65) Prior Publication Data

US 2009/0098873 A1  Apr. 16, 2009

Related U.S. Application Data

(60) Provisional application No. 60/979,799, filed on Oct. 12, 2007.

(51) Int. Cl.
*H04W 4/00* (2009.01)
*H04W 36/00* (2009.01)
*H04W 48/20* (2009.01)
*H04J 11/00* (2006.01)
*H04W 4/02* (2009.01)
*H04W 64/00* (2009.01)
*H04W 84/04* (2009.01)

(52) U.S. Cl.
CPC ........... *H04W 48/20* (2013.01); *H04J 11/0069* (2013.01); *H04W 4/02* (2013.01); *H04W 64/00* (2013.01); *H04W 84/045* (2013.01); *Y02B 60/50* (2013.01)

(58) Field of Classification Search
CPC ..... H04W 36/30; H04W 36/18; H04W 36/08; H04W 88/02; H04W 4/02; H04W 88/06
USPC ................ 455/436, 422.1; 375/230, 232, 267
See application file for complete search history.

(56) References Cited

U.S. PATENT DOCUMENTS 4,707,841 A * 11/1987 Yen et al. ...................... 375/230
5,093,926 A     3/1992 Sasuta
5,640,677 A     6/1997 Karlsson
(Continued)

FOREIGN PATENT DOCUMENTS

CN   1129509 A   8/1996
CN   1207859 A   2/1999
(Continued)

OTHER PUBLICATIONS

International Search Report and Written Opinion—PCT/US2008/079568—International Search Authority, EPO—May 18, 2009.
(Continued)

*Primary Examiner* — William D Cumming
(74) *Attorney, Agent, or Firm* — James Hunt Yancey, Jr.; Qualcomm I.P. Dept.

(57) ABSTRACT

A system, method and computer product for a mobile station to locate a femto cell, the method comprising: (a) storing in a database information to locate at least one femto cell; (b) receiving, from at least one macro cell, location information of the UE; (c) searching within the database to determine if the UE is in a general proximity of at least one femto cell; (d) if so, accessing the femto cell using the database information corresponding to the femto cell.

36 Claims, 9 Drawing Sheets

(56) References Cited

U.S. PATENT DOCUMENTS

| | | | |
|---|---|---|---|
| 5,896,573 A | 4/1999 | Yang et al. | |
| 5,983,097 A * | 11/1999 | Kakinuma et al. | 455/422.1 |
| 6,031,829 A | 2/2000 | Dupuy et al. | |
| 6,167,268 A | 12/2000 | Souissi et al. | |
| 6,529,491 B1 | 3/2003 | Chang et al. | |
| 6,539,491 B1 | 3/2003 | Skergan et al. | |
| 6,590,881 B1 | 7/2003 | Wallace et al. | |
| 6,621,811 B1 | 9/2003 | Chang et al. | |
| 6,956,527 B2 | 10/2005 | Rogers et al. | |
| 6,983,156 B2 | 1/2006 | Fukushima et al. | |
| 6,999,778 B2 | 2/2006 | DiBuduo | |
| 7,020,111 B2 | 3/2006 | Ozluturk et al. | |
| 7,054,627 B1 * | 5/2006 | Hillman | 455/422.1 |
| 7,254,407 B1 | 8/2007 | Bokish | |
| 7,263,370 B1 | 8/2007 | Infosino | |
| 7,289,541 B2 | 10/2007 | Elam | |
| 7,319,878 B2 | 1/2008 | Sheynblat et al. | |
| 7,340,278 B2 | 3/2008 | Nakada | |
| 7,346,321 B2 | 3/2008 | Backes | |
| 7,395,074 B2 | 7/2008 | Syrjarinne | |
| 7,433,694 B2 | 10/2008 | Morgan et al. | |
| 7,477,920 B2 | 1/2009 | Scheinert et al. | |
| 7,715,471 B2 * | 5/2010 | Werner et al. | 375/232 |
| 7,840,985 B2 | 11/2010 | MacInnis | |
| 8,045,638 B2 * | 10/2011 | Grant et al. | 375/267 |
| 8,169,982 B2 | 5/2012 | Gogic et al. | |
| 2002/0082044 A1 | 6/2002 | Davenport | |
| 2003/0008669 A1 | 1/2003 | Stein et al. | |
| 2003/0022686 A1 | 1/2003 | Soomro et al. | |
| 2003/0048758 A1 | 3/2003 | Jones et al. | |
| 2003/0073438 A1 | 4/2003 | Fukushima et al. | |
| 2003/0118015 A1 | 6/2003 | Gunnarsson et al. | |
| 2003/0144006 A1 | 7/2003 | Johansson et al. | |
| 2003/0214937 A1 | 11/2003 | Lindoff et al. | |
| 2004/0071119 A1 | 4/2004 | Ishikawa et al. | |
| 2004/0147232 A1 | 7/2004 | Zodnik | |
| 2004/0162084 A1 | 8/2004 | Wang | |
| 2004/0166886 A1 | 8/2004 | Laroia et al. | |
| 2005/0009521 A1 | 1/2005 | Preece | |
| 2005/0018597 A1 | 1/2005 | Yuda et al. | |
| 2005/0037775 A1 | 2/2005 | Moeglein et al. | |
| 2005/0078033 A1 | 4/2005 | Tamaki et al. | |
| 2005/0227689 A1 | 10/2005 | Jewett | |
| 2005/0246334 A1 | 11/2005 | Tao et al. | |
| 2005/0250496 A1 | 11/2005 | Hason et al. | |
| 2005/0272444 A1 | 12/2005 | Heffield et al. | |
| 2006/0016850 A1 | 1/2006 | Yoshie | |
| 2006/0045134 A1 | 3/2006 | Eldon et al. | |
| 2006/0052067 A1 | 3/2006 | Singh et al. | |
| 2006/0148486 A1 | 7/2006 | Kim et al. | |
| 2006/0234739 A1 | 10/2006 | Thadasina et al. | |
| 2007/0002813 A1 | 1/2007 | Tenny et al. | |
| 2007/0004428 A1 | 1/2007 | Morgan et al. | |
| 2007/0019586 A1 | 1/2007 | Nanda et al. | |
| 2007/0021126 A1 | 1/2007 | Nanda et al. | |
| 2007/0030956 A1 | 2/2007 | Hornig | |
| 2007/0053340 A1 | 3/2007 | Guilford | |
| 2007/0097938 A1 | 5/2007 | Nylander et al. | |
| 2007/0097939 A1 | 5/2007 | Nylander et al. | |
| 2007/0105527 A1 | 5/2007 | Nylander et al. | |
| 2007/0121560 A1 | 5/2007 | Edge | |
| 2007/0178914 A1 | 8/2007 | Montenegro | |
| 2007/0184185 A1 | 8/2007 | Besinger et al. | |
| 2007/0184845 A1 | 8/2007 | Troncoso | |
| 2007/0238448 A1 | 10/2007 | Gallagher et al. | |
| 2008/0153533 A1 | 6/2008 | Claussen et al. | |
| 2009/0034501 A1 | 2/2009 | Hahm et al. | |
| 2009/0061821 A1 | 3/2009 | Chen et al. | |
| 2009/0092111 A1 | 4/2009 | Horn et al. | |
| 2009/0098873 A1 * | 4/2009 | Gogic | 455/436 |
| 2009/0098885 A1 | 4/2009 | Gogic et al. | |
| 2009/0122773 A1 | 5/2009 | Gogic | |
| 2009/0156165 A1 | 6/2009 | Raghothaman et al. | |
| 2009/0163227 A1 | 6/2009 | Collins | |
| 2009/0221287 A1 | 9/2009 | Balasubramanian et al. | |
| 2010/0054206 A1 | 3/2010 | Kalhan | |
| 2010/0056177 A1 | 3/2010 | Kojima | |
| 2010/0069066 A1 | 3/2010 | Shen et al. | |
| 2010/0120394 A1 | 5/2010 | Mia et al. | |
| 2010/0130212 A1 | 5/2010 | So et al. | |
| 2010/0178916 A1 | 7/2010 | Jamadagni | |
| 2010/0240397 A1 | 9/2010 | Buchmayer et al. | |
| 2010/0246529 A1 | 9/2010 | Ishizu et al. | |
| 2010/0260052 A1 | 10/2010 | Cho et al. | |
| 2010/0304741 A1 | 12/2010 | Gogic et al. | |
| 2010/0329206 A1 | 12/2010 | Thome et al. | |
| 2011/0105128 A1 | 5/2011 | Narasimha | |
| 2011/0130115 A1 | 6/2011 | Venkatachalam | |
| 2011/0134833 A1 | 6/2011 | Gogic | |
| 2011/0170481 A1 | 7/2011 | Gomes et al. | |
| 2011/0205932 A1 | 8/2011 | Ekici et al. | |
| 2012/0015649 A1 | 1/2012 | Li et al. | |
| 2012/0106349 A1 | 5/2012 | Adjakple et al. | |
| 2012/0108199 A1 | 5/2012 | Wang et al. | |
| 2012/0122492 A1 | 5/2012 | Zhou et al. | |
| 2012/0142362 A1 | 6/2012 | Mori | |
| 2012/0220310 A1 | 8/2012 | Gogic et al. | |

FOREIGN PATENT DOCUMENTS

| | | |
|---|---|---|
| CN | 1215659 C | 8/2005 |
| CN | 1894979 A | 1/2007 |
| CN | 101563947 A | 10/2009 |
| EP | 0865172 A2 | 9/1998 |
| EP | 0973271 A1 | 1/2000 |
| EP | 1037482 A2 | 9/2000 |
| EP | 1119137 A1 | 7/2001 |
| EP | 1298847 A1 | 4/2003 |
| EP | 1365613 A1 | 11/2003 |
| EP | 1739881 A1 | 1/2007 |
| EP | 1848125 | 10/2007 |
| GB | 2313257 A | 11/1997 |
| GB | 2389005 | 11/2003 |
| GB | 2398970 | 9/2004 |
| GB | 2446847 A | 8/2008 |
| JP | 10221425 A | 8/1998 |
| JP | 2003506960 A | 2/2003 |
| JP | 2003519995 T | 6/2003 |
| JP | 2004297121 A | 10/2004 |
| JP | 2004320473 A | 11/2004 |
| JP | 2004535575 T | 11/2004 |
| JP | 2005509136 A | 4/2005 |
| JP | 2005123662 A | 5/2005 |
| JP | 2006074468 A | 3/2006 |
| JP | 2006508603 A | 3/2006 |
| JP | 2006186551 A | 7/2006 |
| JP | 2007520146 A | 7/2007 |
| JP | 2009504018 A | 1/2009 |
| JP | 2009504019 A | 1/2009 |
| JP | 2009510973 A | 3/2009 |
| JP | 2010074779 A | 4/2010 |
| JP | 2010081118 A | 4/2010 |
| KR | 20080079946 A | 9/2008 |
| RU | 2113772 C1 | 6/1998 |
| RU | 2197780 C2 | 1/2003 |
| RU | 2296436 C2 | 3/2007 |
| RU | 2007134181 A | 3/2009 |
| RU | 2360378 C1 | 6/2009 |
| WO | WO9501706 A1 | 1/1995 |
| WO | 9919743 | 4/1999 |
| WO | WO0075684 A1 | 12/2000 |
| WO | WO0111804 A1 | 2/2001 |
| WO | WO0115340 A1 | 3/2001 |
| WO | WO-0239759 A2 | 5/2002 |
| WO | 02082832 | 10/2002 |
| WO | WO03001687 A2 | 1/2003 |
| WO | WO-03010552 A2 | 2/2003 |
| WO | WO03081939 A1 | 10/2003 |
| WO | WO03100647 A1 | 12/2003 |
| WO | WO03101138 A1 | 12/2003 |
| WO | 2004052041 A1 | 6/2004 |
| WO | WO2004051887 A2 | 6/2004 |
| WO | WO2004077753 A2 | 9/2004 |
| WO | WO-2005036836 A1 | 4/2005 |

(56) References Cited

FOREIGN PATENT DOCUMENTS

| WO | WO2005039214 A1 | 4/2005 |
| WO | WO2005057834 A2 | 6/2005 |
| WO | WO-2005076656 A1 | 8/2005 |
| WO | WO2005088991 A1 | 9/2005 |
| WO | WO2007022005 | 2/2007 |
| WO | 2007040449 A1 | 4/2007 |
| WO | WO2007040454 A2 | 4/2007 |
| WO | WO2007112559 A1 | 10/2007 |
| WO | WO2008030956 | 3/2008 |
| WO | 2008055251 A2 | 5/2008 |
| WO | WO2008076222 | 6/2008 |
| WO | WO2008109842 | 9/2008 |
| WO | WO2008131588 | 11/2008 |
| WO | WO2008131591 | 11/2008 |
| WO | WO2008136416 | 11/2008 |
| WO | WO-2009108811 A1 | 9/2009 |
| WO | WO-2009116427 A1 | 9/2009 |
| WO | WO2009120902 A1 | 10/2009 |

OTHER PUBLICATIONS

International Search Report and Written Opinion—PCT/US08/079515, International Search Authority—European Patent Office—Jun. 26, 2009.

European Search Report—EP10168857, Search Authority—Munich Patent Office, Feb. 8, 2011.

European Search Report—EP10168859, Search Authority—Munich Patent Office, Feb. 8, 2011.

Bender, P., et al., "CDMA/HDR: A Bandwidth-Efficient High-speed Wireless Data Service for Nomadic Users" IEEE Communications Magazine, IEEE Service Center, Piscataway, US, vol. 38, No. 7, Jul. 1, 2000, pp. 70-77, XP010091318.

Dimitri Rubin and Todd Young: "Femtocells Bridging Reliable Location and Timing Indoors" Insidegnss, vol. 3, No. 7, 2008, pp. 40-46, XP002520000 the whole document.

EE624 Mobile Communications Systems (MCS) in: Spread Spectrum Systems, Communication Networks Research Lab, (Fall 2000).

Taiwan Search Report—TW097139251—TIPO—May 21, 2012.

Taiwan Search Report—TW101145340—TIPO—May 22, 2014.

3GPP TS 25.133 V8.10.0 (Mar. 2010), 3rd Generation Partnership Project; Technical Specification Group Radio Access Network; Requirements for support of radio resource management (FDD) (Release 8), 236 pp.

Universal Mobile Telecommunications, System (UMTS); Radio Resource Control, (RRC); Protocol specification (3GPP TS 25.331 version 9.1.0 Release 9), Technical Specification, European Telecommunications Standards Institute (ETSI), 650, Route des Lucioles; F-06921 Sophia-Antipolis; France, vol. 3GPP RAN 2, No. V9.1.0, Feb. 1, 2010, XP014046584, p. 461-467 p. 1684-1685, paragraph 14.7a p. 1688, paragraph 14.11.1-p. 1690, paragraph 14.11.2.

* cited by examiner

| SID/NID | Femto ID | Macro BS Set | Pilot $E_C/I_0$ Threshold Vector | Mean Pilot Phase Vector | Pilot Phase Deviation Vector |
|---|---|---|---|---|---|
| A | $A_1$ | $C(A_1)$ | $D(A_1)$ | $P(A_1)$ | $Q(A_1)$ |
| | $A_2$ | $C(A_2)$ | $D(A_2)$ | $P(A_2)$ | $Q(A_2)$ |
| | $A_3$ | $C(A_3)$ | $D(A_3)$ | $P(A_3)$ | $Q(A_3)$ |

FIG. 3

| Baseline: Prior to femto deployment (all-macro cells) | | | Rel. Impact |
|---|---|---|---|
| No. of correlation computations in slot cycle | | 3,000 | |
| Number of wake cycles in a day | | 33,750 | |
| Total correlation computations per day | millions | 101 | 100% |
| Legacy (Femto-Unaware) mobile subscribed to femtos | | | |
| No. of corr. comp. in slot cycle when on femto | | 400 | |
| No. of corr. comp. in slot cycle when on macro | | 4,000 | |
| Total correlation computations per day | millions | 74 | 73% |
| Femto-Aware mobile subscribed to femtos | | | |
| No. of corr. comp. in slot cycle when on macro | | 3,000 | |
| No. of targeted search corr. comp. in slot cycle | | 52 | |
| No. of exploratory seach corr. comp. in Expl. Period | | 12,800 | |
| No. of corr. comp. in slot cycle when on femto | | 400 | |
| Total correlation computations per day | millions | 58 | 57% |
| Corr. computations due to expl. search | millions | 0.31 | |
| Impact of expl. search on overall search effort | | | 0.5% |

FIG. 7A

SYSTEM AND METHOD TO LOCATE FEMTO CELLS WITH PASSIVE ASSISTANCE FROM A MACRO CELLULAR WIRELESS NETWORK

CLAIM OF PRIORITY UNDER 35 U.S.C. §119

The present Application for Patent claims priority to Provisional Application No. 60/979,799 entitled "SYSTEM AND METHOD FOR FINDING FEMTO CELL WITH PASSIVE ASSISTANCE FROM A MACRO CELLULAR WIRELESS NETWORK" filed Oct. 12, 2007, and assigned to the assignee hereof and hereby expressly incorporated by reference herein.

BACKGROUND

1. Field

The present application relates generally to wireless communications, and more specifically to methods and systems to enable identification of femto cells or access point base stations with passive assistance from a macro cellular wireless network.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the mobile operator's network via DSL router or cable modem.

One of the issues with mobile stations and femto cells is how the Mobile Station (MS) (sometimes also called User Equipment—UE, or Access Terminal—AT) finds a femto cell when it is operating on a macro-cellular network. The mobile station may be on a frequency different than one used by the femto cell. The femto cell may reuse one of several available carrier frequencies. If the mobile is not on that very frequency when using the macro cellular network, it would miss the femto cell, and continue to operate on the macro cell, although it is within the coverage of the femto cell. Additionally, even if there is a way to find a femto cell, mobile may not be authorized to access it (access may be restricted). The problem can be further complicated by the fact that new femto cells are put in operation all the time.

Currently proposed solutions use pilot beacons to signal on other frequencies the presence of the femto cell on the frequency used by femto cells. This approach has a weakness because it adds to interference on the other frequencies. Other proposals include constant periodic search for femto cells, which can hurt battery life. Accordingly, there is a need in the art for mobile devices to be able to locate femto cells with passive assistance from macro cellular wireless network.

SUMMARY

The present invention relates to as a system and a method to locate a femto cell with passive assistance from macro cellular wireless networks that substantially eliminate one or several disadvantages of the related art.

In one aspect of the invention there is a system, method and computer product for a mobile station to locate a femto cell, the method comprising: (a) determining if the UE is in statutory state, wherein a degree of mobility can be evaluated by estimating total pilot phase excursions over a period of time; (b) performing a femto cell frequency scan by the UE; (c) conducting a search for Pilots PN Offsets reserved for femto cell use; (d) finding the femto cell; (e) determining if the femto cell is authorized to use; (f) registering the UE on the femto cell.

In other aspects, the WCDMA pilots use synchronization codes which uniquely identify a base station (Node B), which are called "Gold Codes". In WDCMA technology a mobile station locates a femto cell by conducting a search for all pilots using Gold Codes reserved for femto cell use.

In other aspects of the invention there is a system, method and computer product for a mobile station to locate a femto cell, the method comprising: (a) storing in a database resident in the mobile information to locate at least one femto cell; (b) receiving, from at least one macro cell, location information of the UE; (c) searching within the database to determine if the UE is in a general proximity of at least one femto cell; (d) if so, accessing the femto cell using the database information corresponding to the femto cell.

The database gets searched for match, wherein a system ID matches the system ID of the macro system around the femto cell, a network ID matches the network ID of the macro system around the femto cell, a base station ID matches the base station ID of a mother cell (macro cell), base station latitude matches the latitude of the mother cell and base longitude matches the longitude of the mother cell.

If there is a match, tuning the UE to $F_F$, which is a femto cell frequency stored in the aforementioned database, taking a sample segment of CDMA signal, conducting femto cell pilot search for the pilot that is also identified in the aforementioned database. In case in CDMA2000, the search is for the femto Pilot PN Offsets, and in the case of WCDMA, it's for the Gold Code used by this femto cell pilot. In other radio technologies, there are may be other parameters that are searched for this purpose.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

FIG. 3 illustrates refinement of autonomous and customized discovery of femto cells;

FIG. 7A illustrates result summary of exploratory search impact on UE battery life;

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

In the description herein, a node that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. A simplified example of how femto nodes may be deployed in a network will now be described with reference to FIGS. 1 and 2.

Figure 1:
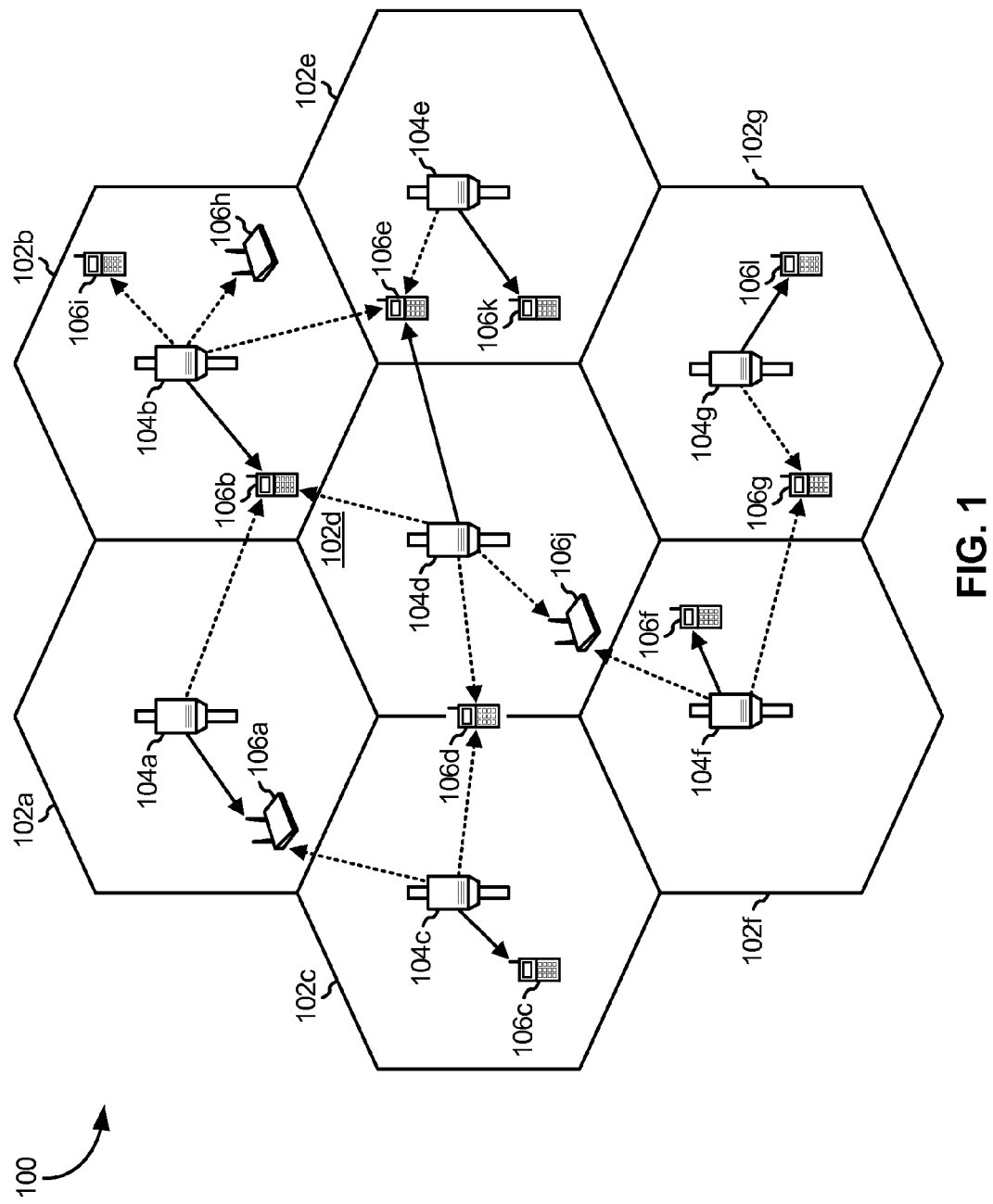
FIG. 1 is a exemplary wireless communication system.

FIG. 1 illustrates an exemplary wireless communication system 100 configured to support a number of users, in which various disclosed embodiments and aspects may be implemented. As shown in FIG. 1, by way of example, system 100 provides communication for multiple cells 102 such as, for example, macro cells 102a-102g, with each cell being serviced by a corresponding access point (AP) or points 104, such as, for example, APs 104a-104g. Each macro cell may be further divided into one or more sectors (not shown). As further shown in FIG. 1, various access terminal (AT) devices 106, including ATs 106a-106l, also known interchangeably as user equipment (UE) or as mobile stations (MS), or as terminal devices, may be dispersed at various locations throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region. For example, macro cells 102a-102g may cover only a few blocks within a neighborhood or several square miles in a rural environment.

Figure 2:
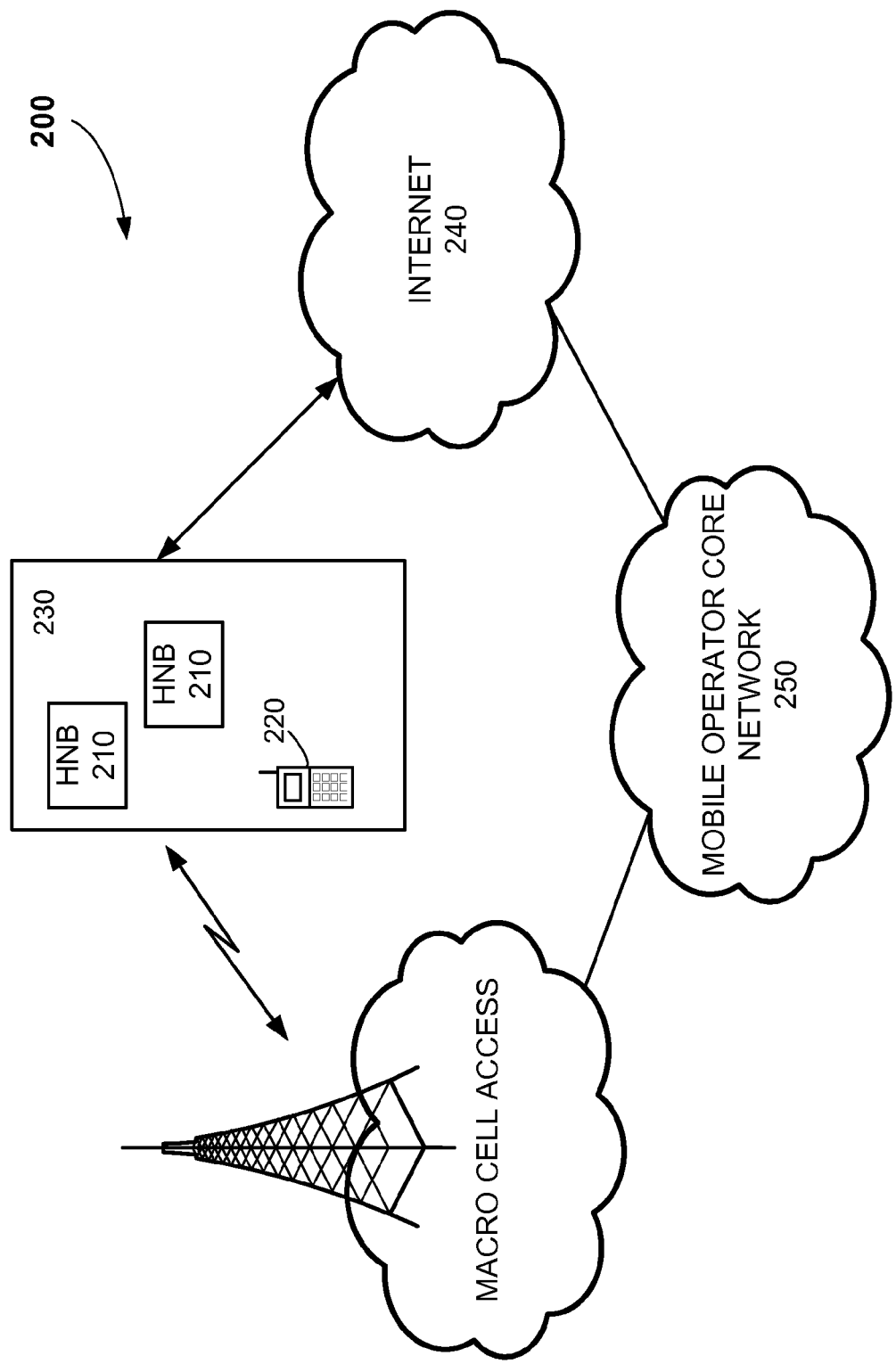
FIG. 2 is a an exemplary communication system to enable deployment of access point base stations within a network environment.

FIG. 2 illustrates an exemplary communication system to enable deployment of femto nodes, also known as femto cells (access point base stations) within a network environment. As shown in FIG. 2, the system 200 includes multiple femto nodes, or, in the alternative, femto cells, access point base stations, Home Node B (HNB) units such as, for example, HNB 210, each being installed in a corresponding relatively small coverage network environment, such as, for example, in one or more sites 230, and such as, for example, being configured to serve associated user equipment 220, as well as alien user equipment. Each HNB 210 may be coupled to and further configured to communicate via a wide area network, such as the Internet 240, and to any node on the Internet, including a macro mobile operator core network 250 (also referred to as a "core network"). In exemplary configurations, a site might include DSL routers and/or cable modems. As shown, there are at least two communication paths between a terminal device 220 and the macro mobile operator core network 250, namely a path including macro cell access 270, and a path including the Internet 240.

Although embodiments described herein use 3GPP terminology, it is to be understood that the embodiments may be applied not only to 3GPP (Rel99, Rel5, Rel6, Rel7, etc.) technology, but also to 3GPP2 (1xRTT, 1xEV-DO Rel0, RevA, RevB, etc.) technology, as well as to other known and related technologies. In such embodiments described herein, the proprietor of the HNB 210 might subscribe to mobile services such as, for example, 3G mobile services, offered through the macro mobile operator core network 250, and the UE 220 might be capable of operating both in a macro cellular environment and in an HNB-based small coverage network environment. Thus, the HNB 210 might be adapted for backward compatibility with any existing UE 220.

One of the issues with UEs and HNBs or femto cells is how to find a femto cell 210 when it is operating on a macro-cellular network 250. When on the macro-cellular network, the UE 220 may be operating on a frequency different than the one used by the femto cell 210. In the course of searching procedures, where the UE 220 evaluates a neighbor list from the macro cells, it will not find the femto cell 210. Femto cells may use one of several available carrier frequencies. If the UE 220 is not operating on that very frequency, it would miss the femto cell 210, and continue to operate on the macro cell, although it is within coverage of the femto cell 210. Additionally, even if there is a way to find a femto cell 210, the UE 220 may not be authorized to access it (access may be restricted). The problem can be further complicated by the fact that new femto cells are put in operation all the time. So, it would be advantageous to determine how UE becomes aware of these new femto cells on which it has access authorization, so that it may use them when within their coverage.

The key advantages of the invention include:—improved battery performance—largely autonomous operation—automatic provisioning of the UEs, without requiring network downloads.

According to embodiments described in detail below, the UE 220 acquires (by learning or otherwise) a database of HNBs or femto cells 210 individualized for that UE 220. The database is stored on the UE 220, and may include for each femto cell 210 the following information:—Carrier frequency of the HNB—Location (latitude/longitude/altitude (LAT/LON/ALT) of the HNB, or an alternative)—List of macro cell CDMA Pilots and phase offsets in vicinity of the HNB, which in that vicinity have power (e.g. pilot power expressed as chip energy to total interference ratio $E_c/I_0$) above a given threshold—Date femto access was last used/acquired by this UE 220—Other identification information, such as System ID for the femto cell, Network ID for the femto cell, and Radio Technology used by the femto cell.

In one embodiment, each entry of the database circumscribes a femto cell location in a non-orthogonal coordinate system comprised of macro pilots visible at that femto location (with qualifying minimum $E_c/I_0$), the phase delay of each pilot, and allowed deviation around that nominal phase delay. When the database is already available in the UE 220, it can be used to gate femto searching. The UE 220 on a frequency other than $F_F$ conducts search on $F_F$ only when there is a database match. In one embodiment, the database elements include macro pilot PN offsets, which are all visible by the UE 220 on whatever carrier it is monitoring in the idle state. These PN offsets are accessible to the UE in the course of routine operation in idle state, and the UE does not have to do anything different until there is a database match. Then the UE 220 starts scanning for the HNB or femto cell 210, which is on a different frequency. Operating this way will reduce battery drainage.

FIG. 3 illustrates refinement of autonomous and customized discovery of femto cells, and defines content of femto constellation database (FCD) stored in each UE individually. The location of a femto cell is described by means of primitives comprised of macro system parameters: within the area described by base station (BS) set C, in which Pilots exceed threshold $E_c/I_0$ vector D, and have phase P within tolerance Q. All these parameters are measured with little or no expense of CDMA procedure (idle or active state), hence they will cost practically nothing in terms of battery life and/or network use, in contrast to e.g. A-GPS geo-location methodology.

Figure 4:
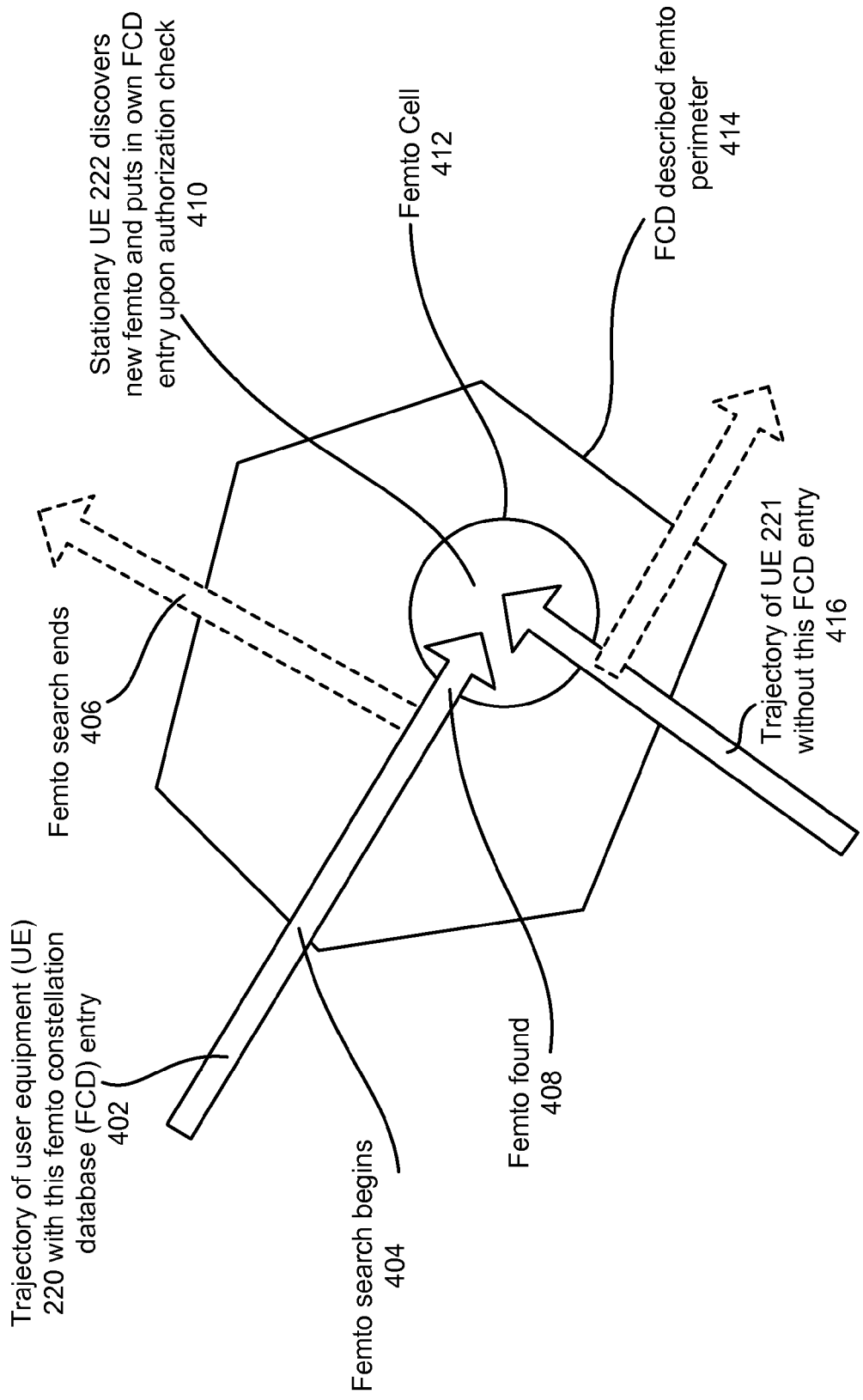
FIG. 4 illustrates a femto cell search using a femto constellation database (FCD)

FIG. 4 illustrates a femto cell search using the FCD. Location of the femto cell in FCD is expressed in a non-orthogonal coordinate system, and need not be of high degree of accuracy—it's only used to gate searching for femto cell. Finding location of the femto cell can be improved with bad geometries (the case when the UE is in a location dominated by a single BS, so others are difficult to detect) with Highly Detectable Pilots defined for HRPD radio technology. Element 402 shows trajectory of UE 220 approaching a femto cell 412 which is in that UEs FCD. Element 416 illustrates trajectory of UE 221 without that FCD entry. The femto cell search begins at element 404 (UE 220 enters the FCD described perimeter) and ends at element 406 (UE exits that perimeter). Element 408 illustrates that femto cell is found, i.e. UE 220 is close enough to the femto cell 412, so that when it searches for it, it detects the femto cell pilot of sufficient $E_c/I_0$. Element 410 illustrates that "Stationary" UE 222 upon conducting exploratory search discovers a new femto cell and puts it in FCD upon authorization check. Element 412 illustrates the femto cell. Element 414 illustrates how FCD describes femto perimeter. The solid lines represent "trajectory" of non-femto UE and "trajectory" of a femto UE. The dotted line represents an alternative trajectory of a UE that enters the perimeter described in the FCD, but does not approach the associated femto cell close enough to be able to detect it. If the UE 220 detects a femto cell not on its FCD, it may choose to evaluate it and eventually place into FCD. Generally, a femto is fit to be in FCD if the UE 220 can register on that femto. When on a femto, UE routinely monitors femto pilot, evaluates signal strength, in case Hand Off (HO) is needed. This monitoring can be used to update FCD, e.g. to adjust femto perimeter as it was shown in Element 414.

Femto cell may perform better than a UE in deriving its location from a macro cell, since femto location is fixed. Thus the femto cell may spend a lot of time searching for pilots of neighboring macro cells, integrating CDMA signals even from very weak pilots. Battery limitation is not an issue here. The antenna configuration with a higher gain is used, further improving macro pilot detectability. Femto tunes on a macro frequency known to contain only macro cells. Femto detects the CDMA system and synchronizes itself with the strongest pilot (with $E_c/I_0$ above a given threshold). Femto comprehensively searches for additional pilots, which it could detect at a very low $E_c/I_0$. Femto also reports to the Operation, Administration, Maintenance and Provisioning (OAM&P) system pilot PN Offsets and relative timing.

OAM&P system knows LAT/LON of the macro cells and performs triangulation to determine the location of the femto cell. OAM&P system sends LAT/LON information to the subject femto cell. An alternative approach is LAT/LON lookup from the address (point of termination of fixed broadband connection). This approach could be used as check of consistency, resulting in a more robust design.

In one embodiment, each of the femto cells in the mobile's database contains the following information:

FEMTO_ORD: Ordinal number if mobile's database entry. The only practical limitation for maximum entries is MS memory. The very first entry can be reserved for that mobile's home femto cell;

FEMTO_BAND_CLASS: Band Class where femtos deployed;

FEMTO_CHAN: Channel number where femto cell deployed;

FEMTO_SID: System ID for the Femto Cell;

FEMTO_NID: Network ID for the Femto Cell;

FEMTO_TYPE: Radio Technology used by the femto cell;

FEMTO_BASE_ID: Base Station Identity (BASE_ID) broadcast in the femto cell System Parameters Message (SPM);

FEMTO_LAT: Base Station Latitude (BASE_LAT) broadcast in the femto cell SPM;

FEMTO_LONG: Base Station Longitude (BASE_LONG) broadcast in the femto cell SPM;

FEMTO_PN: Pilot PN Offset used by this femto cell;

MACRO_SID: SID of the macro system around the femto;

MACRO_NID: NID of the macro system around the femto;

MACRO_BASE_ID: BASE_ID of the "mother cell", where

"Mother Cell" is the macro cell mobile is connected to in the idle state, when within the coverage area of the femto cell;

MACRO_BASE_LAT: Latitude of the "mother cell";

MACRO_BASE_LONG: Longitude of the "mother cell";

MACRO_PN_VECTOR: Phase set of macro pilots near femto cell. Using this phase set in the FCD, UE 220 can gauge proximity to target femto more precisely, and reduce searching.

Access time, acquisition date/time counters. This is used to rank entries in the database and drop off infrequently/not-recently used ones, when mobile runs out of memory allocated to database.

Figure 5:
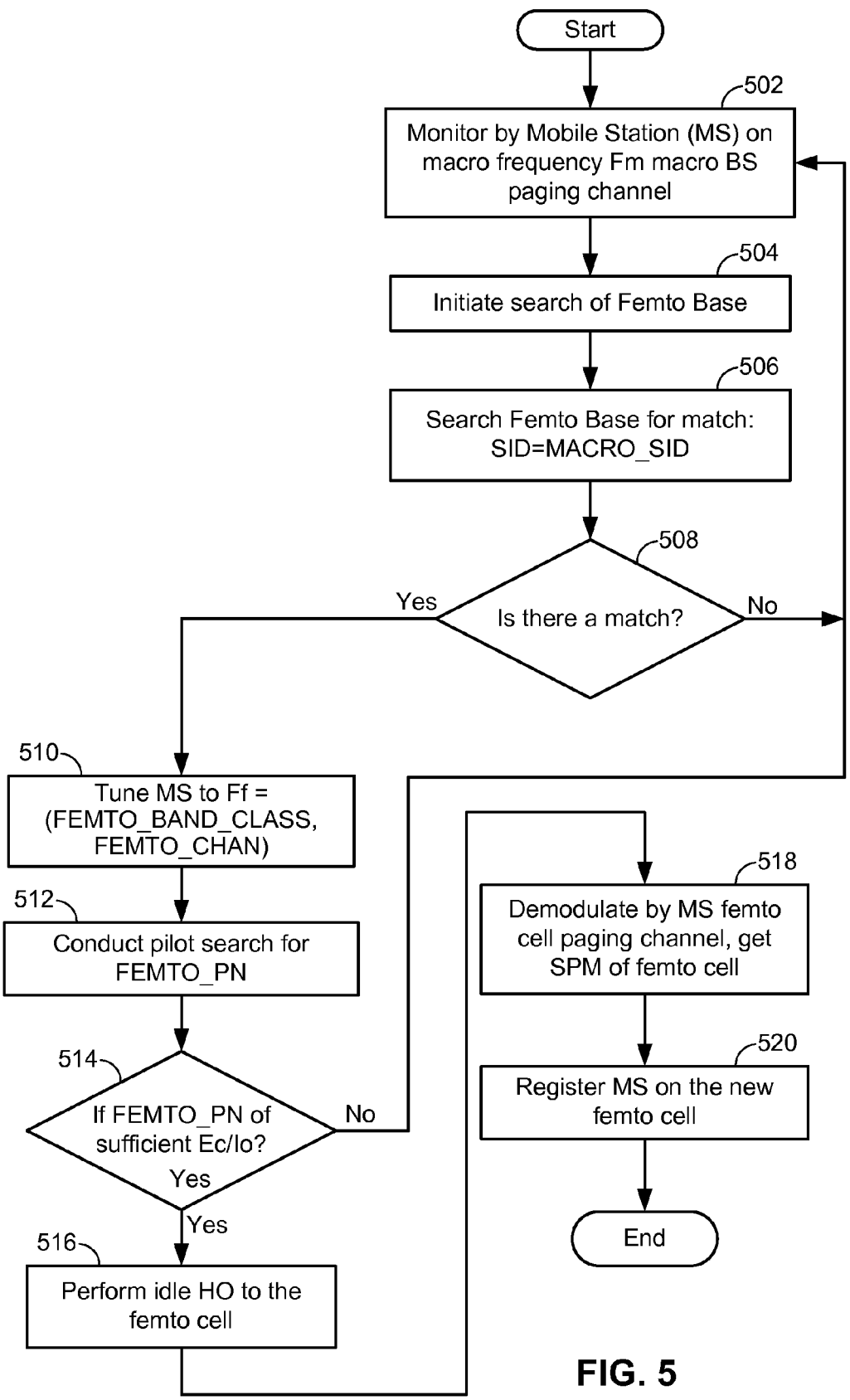
FIG. 5 is a method for a user equipment (UE) to locate a femto cell, according to one embodiment.

FIG. 5 illustrates a method for UE 220 to locate a femto cell. In step 502 UE 220 on macro frequency $F_M$ monitors macro BS paging channel and knows parameters: SID (system ID), NID (Network ID), BASE_ID, BASE_LAT, and BASE_LONG. In step 504 UE 220 initiates search of femto database. In step 506 UE 220 searches the data base for match: SID=MACRO_SID; NID=MACRO_NID; BASE_ID=MACRO_BASE_ID; BASE_LAT=MACRO_BASE_LAT; BASE_LONG=MACRO_BASE_LONG, wherein the system ID matches system ID of the macro system around the femto cell, the network ID matches network ID of the macro system around the femto cell, base ID matches the base ID of the "mother cell", base latitude matches the latitude of the "mother cell" and base longitude matches the longitude of the "mother cell" If match is found in step 508, then in Step 510 UE 220 tunes to frequency $F_F$=(FEMTO_BAND_CLASS, FEMTO_CHAN), which is the Band Class and at the Channel Number where femto cell deployed. Next the UE 220 takes a sample segment of CDMA signal and conducts pilot search for FEMTO_PN (Pilot PN Offset used by this femto cell) in step 512. However, no match is found and UE 220 returns to $F_M$ (macro cell frequency).

In one embodiment the WCDMA pilots use synchronization codes which uniquely identify a base station (Node B), which are called "Gold Codes". In WDCMA technology a mobile station locates a femto cell by conducting a search for all pilots using Gold Codes reserved for femto cell use.

Further, if no FEMTO_PN of sufficient $E_c/I_0$ found in step 514, UE 220 returns to $F_M$. However, if pilot of sufficient $E_c/I_0$ found in step 514, UE 220 performs idle Handoff (HO) to the femto cell in step 516.

In step 518, UE 220 demodulates femto cell paging channel and gets System Parameters Message (SPM) of the femto cell. UE 220 confirms parameters SID, NID, BASE_ID, etc. match FEMTO_SID (System ID for the Femto Cell), FEMTO_NID (Network ID for the Femto Cell), FEMTO_BASE_ID, etc., stored in the UE's FCD. If confirmation fails (i.e. UE encountered a different femto than the one it was aiming for), the UE 220 may attempt to register on this new femto cell to determine if it is allowed to access it, and if so, may place in database as a new entry.

In step 520 UE 220 is forced to register on the femto cell, since the SID, NID pair is not the same as the one on which it was previously registered (macro SID, NID pair).

The embodiments below describe how to populate the database itself. In one embodiment exploratory searching for femto cells is conducted. The purpose of exploratory search is to discover new femto cells of interest to UE 220, to supplement its internal database. It is not very productive for an UE to continuously conduct exploratory searches, namely to re-tune to a carrier frequency where femto cells are deployed, and to scan for pilots at offsets reserved for femto cells. The battery would be drained in an accelerated fashion. If the UE 220 is moving at vehicular speeds, even if it finds a femto cell 210 which it is authorized to use, it's not going to be worthwhile for UE 220 to register on it, because it will be within its coverage for a very brief period of time. Only when it is in a stationary or near stationary state (with small excursions around a fixed locale, e.g. within a residence), it will be worthwhile for the UE 220 to explore for potential presence of an HNB or femto cell 210. In one embodiment, the UE 220 mobile can use pilot phase deviations of macro cells to evaluate its state of mobility. Here too, the UE 220 simply does its routine operations, searching for pilots in its neighbor list. This raw information about the pilot phases can be used by the mobile to determine its mobility state. Degree of mobility can be evaluated by estimating total pilot phase excursions over a period of time.

Figure 6:
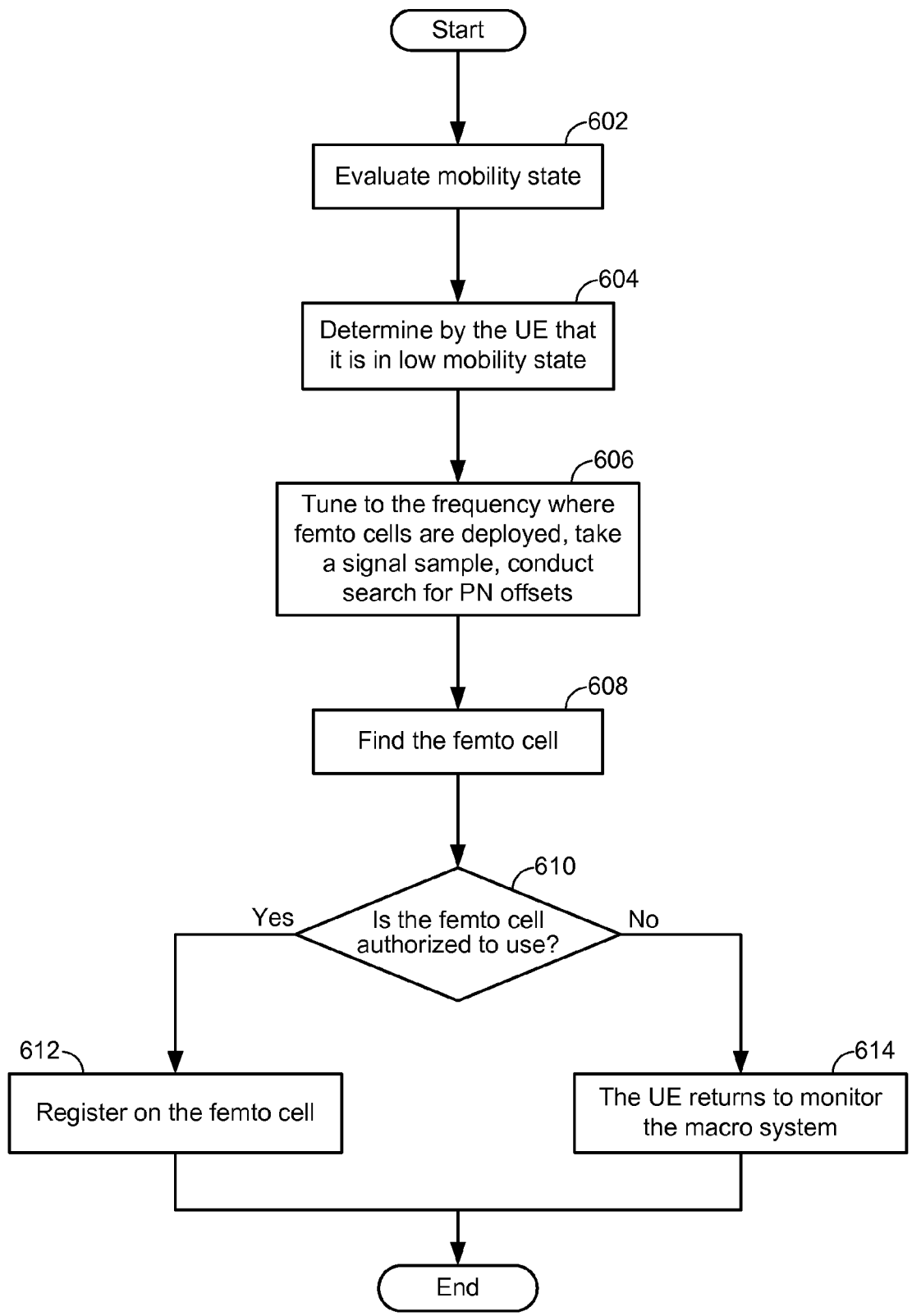
FIG. 6 is another method for the UE to locate a femto cell; according to an alternate embodiment.

FIG. 6 illustrates one embodiment of exploratory search. In Step 602 the UE 220 evaluates its mobility state. In Step 604 the UE 220 determines that it is in the low mobility state. In Step 606 it tunes to the frequency where femto cells are deployed, takes a signal sample and conducts a search for all Pilot PN offsets reserved to femto cell use. In Step 608, if it finds a femto cell 210, it tries to determine if it is authorized to use it in Step 610. Generally, if the UE 220 is allowed to register on the femto cell, if it is authorized to use it as shown in Step 612. If the UE 220 is not allowed to register on the femto cell, the UE 220 returns to monitor the macro system.

During the exploratory search, the battery drain is minor compared to normal idle mode searching which cannot be avoided. Exploratory search is conducted for all Pilot PN Offsets reserved to femto cell use. The search window cannot be narrowed, as UE 220 does not generally know its own location, and cannot estimate propagation delay which shifts its sense of system time from that of the femto cell. Though these factors mean that the search effort is increased relative to idle mode searching, unlike idle mode, which occurs once every several seconds, exploratory searching is conducted rarely, e.g. once every 30 minutes, hence the battery impact is low.

For example:
Pilot Period $T=2^{15}$=32,768 chips (26.667 ms);
Chip Period $T_0$=1/1.2288 ms=0.814 ms;
D=Neighbor Cell Distance: 10 km;
PILOT_INC=3, Macro-Macro PN Offset Distance=512 chips; Macro-Femto=256 chips;
Search Window: $D/(C*T_0)$=41 chips;
Window as percentage of minimum Macro-Macro phase shift: 41/512=8%;
Window as percentage of Macro-femto phase shift: 41/256=16%;

Samples taken for the targeted search can be reused for the purpose of exploratory search. UE 220 must take additional signal samples for exploratory searching, if located in an area other than those identified in its femto database. UE 220 can and should do any off-frequency searches (including exploratory) without missing a page, i.e., exploratory searching should be outside the page wake cycle. While signal sampling is done at $F_F$, search operations can be carried out upon UE 220 return to $F_M$ and if need be, can be spread over several wake cycles while UE 220 continues to monitor the macro system.

For the purpose of estimating exploratory searching impact on battery life, we make the following assumptions:
Number of macro neighbors=15;
Number of explicitly listed femto neighbor PNs=5;
Number of neighbors in the femto neighbor list=2;
Macro search window=50 chips;
Window for targeted femto search=13 chips (10 ms MPS timing error);
Percent of time the mobile is on the femto: 50%;
Percent of time mobile is on the mother cell=5%;
Slot Cycle Time 2.56 s;
Exploratory Search Period=30 minutes;
Size of femto PN constellation=64.
Result is summarized in FIG. 7.

FIG. 7 illustrates that prior to femto deployment (all-macro cells) the search effort equals to 100% with total correlation computations per day equal to 101 millions. The search effort goes down as femtos are deployed (using macro-only search as a baseline), dropping to 73% for legacy mobiles with total correlation computations per day equals to 74 millions, and to 57% for femto-aware mobiles with total correlation computations per day equals to 58 millions.

Exploratory searching has miniscule effect on the overall search effort of a femto-aware mobile (adds only 0.5% in the example).

While idle on macro system, UE performs exploratory scans of femto pilot phase space (must tune to $F_F$), with these objectives: maximize possibility of discovering new femtos not in the FCD, and cope with network configuration changes in both femto and macro network (e.g. new macro cell placed in operation).

As it was mentioned earlier, the exploratory scans are most useful at low mobility conditions, though they can occur in principle any time in Idle State. Degree of mobility can be evaluated by estimating total pilot phase excursions over a period of time.

It should be appreciated that the teachings herein may be implemented in various types of communication devices. In some aspects, the teachings herein may be implemented in wireless devices that may be deployed in multiple access communication system that may simultaneously support communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 7B:
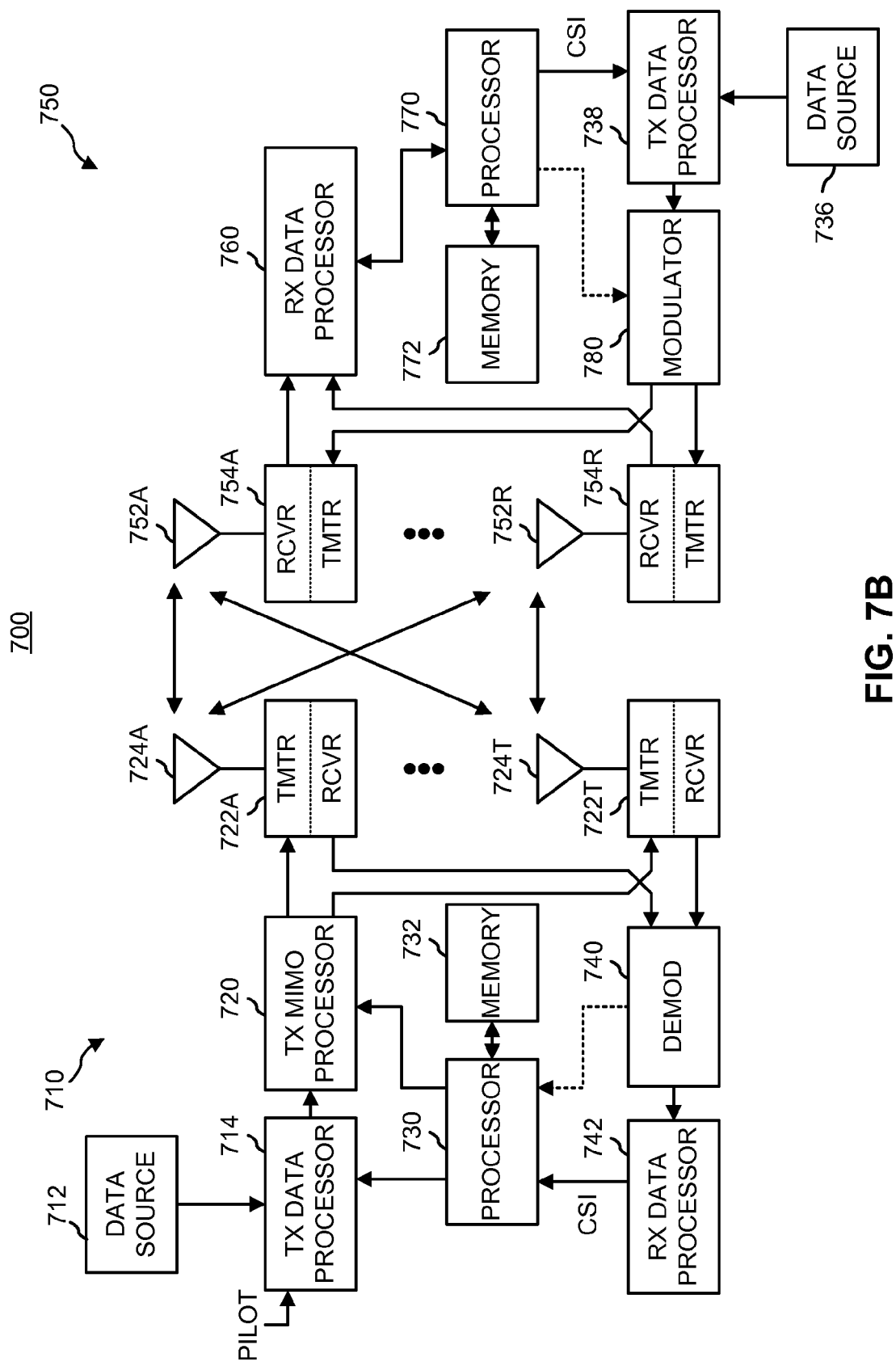
FIG. 7B illustrates a simplified block diagram of several sample aspects of communication components.

The teachings herein may be incorporated into a node (e.g., a device) employing various components for communicating with at least one other node. FIG. 7B depicts several sample components that may be employed to facilitate communication between nodes. Specifically, FIG. 7B illustrates a wireless device 710 (e.g., an access point) and a wireless device 750 (e.g., an access terminal) of a MIMO system 700. At the device 710, traffic data for a number of data streams is provided from a data source 712 to a transmit ("TX") data processor 714.

In some aspects, each data stream is transmitted over a respective transmit antenna. The TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 730. A data memory 732 may store program code, data, and other information used by the processor 730 or other components of the device 710.

The modulation symbols for all data streams are then provided to a TX MIMO processor 720, which may further process the modulation symbols (e.g., for OFDM). The TX MIMO processor 720 then provides $N_T$ modulation symbol streams to $N_T$ transceivers ("XCVR") 722A through 722T. In some aspects, the TX MIMO processor 720 applies beam-forming weights to the symbols of the data streams and to the antenna from which the symbol is being transmitted.

Each transceiver 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 722A through 722T are then transmitted from $N_T$ antennas 724A through 724T, respectively.

At the device 750, the transmitted modulated signals are received by $N_R$ antennas 752A through 752R and the received signal from each antenna 752 is provided to a respective transceiver ("XCVR") 754A through 754R. Each transceiver 754 conditions (e.g., filters, amplifies, and downconverts) a respective received signal, digitizes the conditioned signal to provide samples, and further processes the samples to provide a corresponding "received" symbol stream.

A receive ("RX") data processor 760 then receives and processes the $N_R$ received symbol streams from $N_R$ transceivers 754 based on a particular receiver processing technique to provide $N_T$ "detected" symbol streams. The RX data processor 760 then demodulates, deinterleaves, and decodes each detected symbol stream to recover the traffic data for the data stream. The processing by the RX data processor 760 is complementary to that performed by the TX MIMO processor 720 and the TX data processor 714 at the device 710.

A processor 770 periodically determines which pre-coding matrix to use (discussed below). The processor 770 formulates a reverse link message comprising a matrix index portion and a rank value portion. A data memory 772 may store program code, data, and other information used by the processor 770 or other components of the device 750.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by the transceivers 754A through 754R, and transmitted back to the device 710.

At the device 710, the modulated signals from the device 750 are received by the antennas 724A through 724T, conditioned by the transceivers 722A through 722T, demodulated by a demodulator ("DEMOD") 740, and processed by a RX data processor 742 to extract the reverse link message transmitted by the device 750. The processor 730 then determines which pre-coding matrix to use for determining the beamforming weights then processes the extracted message.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDNM") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 8:
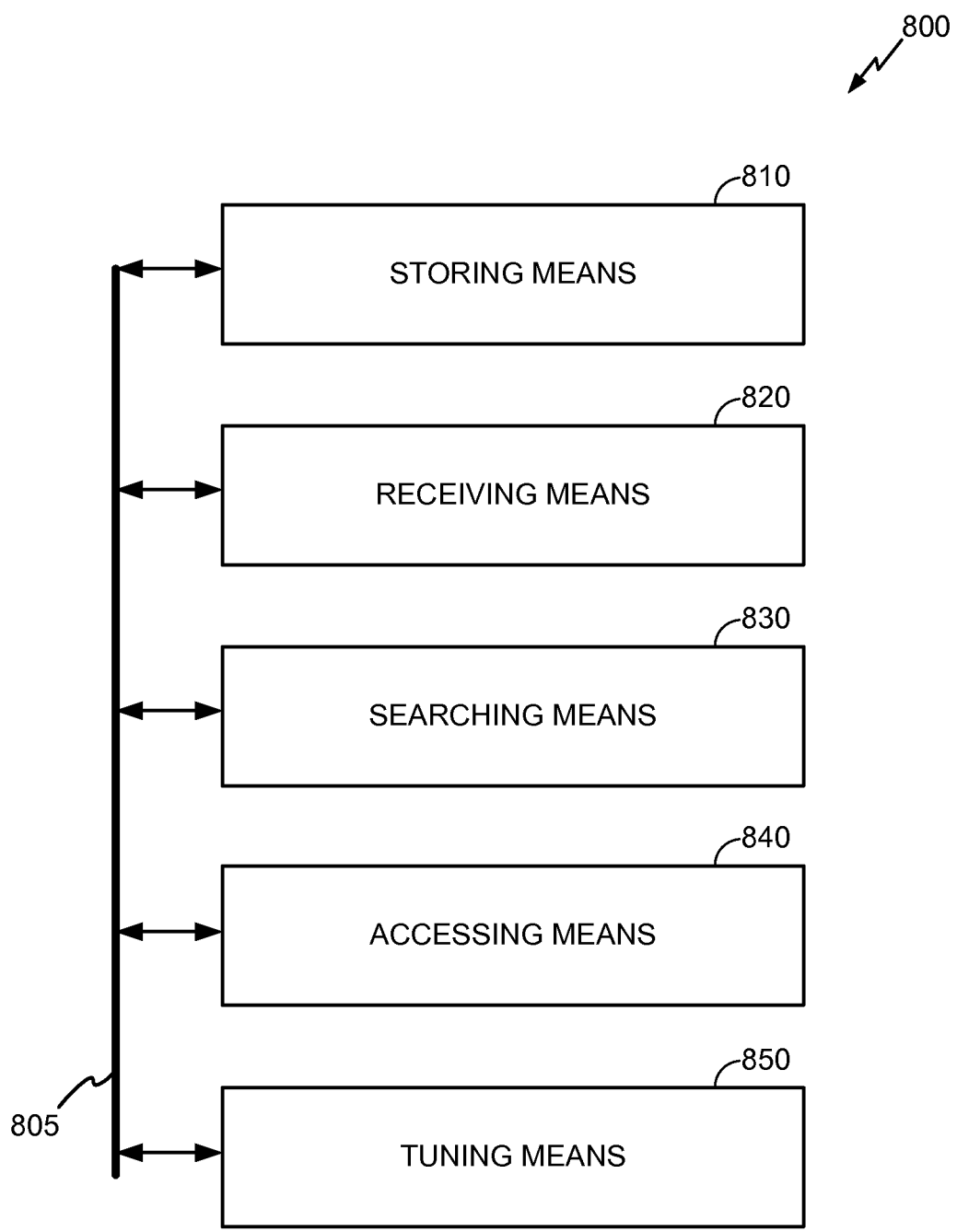
FIG. 8 depicts an example block diagram of a system 800 in accordance with additional aspects described herein.

FIG. 8 depicts an example block diagram of a system 800 in accordance with additional aspects described herein. System 800 provides an apparatus that can facilitate locating a femto cell. Specifically, system 800 can include a plurality of modules or means, each connected to a communication link 805, and can communicate with other modules or means over communication link 805. The plurality of modules or means may include storing means 810, receiving means 820, searching means 830, accessing means 840, and tuning means 850.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a user equipment (UE) to locate a femto cell, the method comprising:
   acquiring, by the UE, one or more femto cells;
   storing in a database information to locate the one or more femto cells acquired by the UE, the information being individualized for the UE and comprising macro system parameters comprising phase offsets and pilots having signal strength above a threshold, wherein the information stored in the database further includes for each femto cell: carrier frequency, location, list of pilot offsets with signal strength above a given threshold, system identification (ID) for the femto cell, network ID for the femto cell, and base ID broadcast for the femto cell;
   searching within the database to determine when the UE is in a general proximity of at least one of the one or more femto cells; and
   when the UE is in a general proximity of at least one femto cell, accessing a femto cell using the database information corresponding to the femto cell.

2. The method of claim 1, further comprising:
   searching the database for a match, wherein there is a match when a system ID database entry matches the system ID of a macro system around the femto cell, a network ID database entry matches the network ID of the macro system around the femto cell, a base ID database entry matches the base ID of a macro cell, base latitude matches the latitude of the macro cell, and base longitude matches the longitude of the macro cell;
   when there is a match, tuning the UE to a femto cell frequency, $F_F$;
   taking a sample segment of a signal;
   conducting search for a cell-specific signal; and
   when there is not a match, tuning the UE to a macro cell frequency, $F_M$.

3. The method of claim 2, further comprising:
   searching the database for the cell-specific signal with sufficient signal strength;
   when the cell-specific signal with sufficient signal strength is found, performing by the UE idle handoff (HO) for the femto cell; and
   when no cell-specific signal with sufficient signal strength is found, tuning the UE to the macro cell frequency, $F_M$.

4. The method of claim 3, further comprising:
   demodulating by the UE a femto cell paging channel;
   getting a femto cell system parameters message (SPM); and
   registering the UE on the femto cell.

5. The method of claim 4, wherein demodulating further comprises:
   confirming parameters by the UE system ID, network ID, and base ID;
   matching with system ID for the femto cell, with the network ID for the femto cell, and base ID broadcast in the femto cell SPM; and
   when confirmation fails, attempting to register on the femto cell to determine when the UE is allowed to access the femto cell.

6. A user equipment (UE) comprising:
   at least one processor;
   memory coupled to the at least one processor;
   a transceiver configured to acquire, by the UE, one or more femto cells; and
   a database configured to store information to locate the one or more femto cells acquired by the UE, the information being individualized for the UE and comprising macro system parameters comprising phase offsets and pilots having signal strength above a threshold;
   wherein the information stored in the database further includes for each femto cell: carrier frequency, location, list of pilot offsets with signal strength above a given threshold, system identification (ID) for the femto cell, network ID for the femto cell, and base ID broadcast for the femto cell;
   wherein the UE searches the database to determine when the UE is in a general proximity of at least one of the one or more femto cells; and
   when the UE is in a general proximity of at least one femto cell, the UE accesses a femto cell using the database information corresponding to the femto cell.

7. The UE of claim 6, wherein a femto search is only conducted when there is a match in the database.

8. The UE of claim 7, wherein there is a match in the database when a system ID matches the system ID of the macro system around the femto cell, a network ID matches the network ID of the macro system around the femto cell, a base ID matches the base ID of a macro cell, base latitude matches the latitude of the macro cell, and base longitude matches the longitude of the macro cell.

9. The UE of claim 8, wherein when there is a match in the database, the UE tunes to a femto cell frequency, $F_F$.

10. The UE of claim 8, wherein when there is not a match in the database, the UE tunes to a macro cell frequency, $F_M$.

11. A non-transitory computer-readable medium comprising codes for causing a computer to:
   acquire, by a user equipment (UE), one or more femto cells;
   store in a database information to locate the one or more femto cells acquired by the UE, the information being individualized for the UE and comprising macro system parameters comprising phase offsets and pilots having signal strength above a threshold, wherein the information stored in the database further includes for each femto cell: carrier frequency, location, list of pilot offsets with signal strength above a given threshold, system identification (ID) for the femto cell, network ID for the femto cell, and base ID broadcast for the femto cell;
   search within the database to determine when the UE is in a general proximity of at least one of the one or more femto cells; and
   when the UE is in a general proximity of at least one femto cell, access a femto cell using the database information corresponding to the femto cell.

12. The non-transitory computer-readable medium of claim 11, further comprising codes for causing a computer to:
   search the database for a match, wherein there is a match when a system ID database entry matches the system ID of the macro system around the femto cell, a network ID database entry matches the network ID of the macro system around the femto cell, a base ID database entry matches the base ID of a macro cell, base latitude matches the latitude of the macro cell, and base longitude matches the longitude of the macro cell;
   when there is a match, tune the UE to a femto cell frequency, $F_F$;
   take a sample segment of a signal;
   conduct search for a cell-specific signal; and
   when there is not a match, tuning the UE to a macro cell frequency, $F_M$.

13. The non-transitory computer-readable medium of claim 11, further comprising codes for causing a computer to:
   search the database for a cell-specific signal with sufficient signal strength;
   when the cell-specific signal with sufficient signal strength is found, perform by the UE idle handoff (HO) for the femto cell; and
   when no cell-specific signal with sufficient signal strength is found, tune the UE to the macro cell frequency, $F_M$.

14. The non-transitory computer-readable medium of claim 11, further comprising codes for causing a computer to:
   demodulate by the UE a femto cell paging channel;
   get a femto cell system parameters message (SPM); and
   register the UE on the femto cell.

15. The non-transitory computer-readable medium of claim 14, further comprising codes for causing a computer to:
   confirm parameters by the UE system ID, network ID and base ID;
   match with system ID for the femto cell, with the network ID for the femto cell, and base ID broadcast in the femto cell SPM; and
   when confirmation fails, attempt to register on the femto cell to determine [[if]] when the UE is allowed to access the femto cell.

16. An apparatus to locate a femto cell, comprising:
   means for acquiring, by a user equipment (UE), one or more femto cells;
   means for storing in a database information to locate the one or more femto cells acquired by the UE, the information being individualized for the UE and comprising macro system parameters comprising phase offsets and pilots having signal strength above a threshold, wherein the information stored in the database further includes for each femto cell: carrier frequency, location, list of pilot offsets with signal strength above a given threshold, system identification (ID) for the femto cell, network ID for the femto cell, and base ID broadcast for the femto cell;
   means for searching within the database to determine when the UE is in a general proximity of at least one of the one or more femto cells; and
   when the UE is in a general proximity of at least one femto cell, means for accessing a femto cell using the database information corresponding to the femto cell, wherein the means for accessing comprises hardware.

17. The apparatus of claim 16, further comprising:
   means for searching the database for match, wherein a system ID database entry matches the system ID of the macro system around the femto cell, a network ID database entry matches the network ID of the macro system around the femto cell, a base ID database entry matches the base ID of a macro cell, base latitude matches the latitude of the macro cell and base longitude matches the longitude of the macro cell;
   when there is a match, means for tuning the UE to a femto cell frequency, $F_F$;
   means for taking a sample segment of a CDMA signal;
   means for conducting search for a cell-specific signal; and
   when there is not a match, means for tuning the UE to a macro cell frequency, $F_M$.

18. The apparatus of claim 17, further comprising:
   means for searching the database for the cell-specific signal with sufficient signal strength;
   when the cell-specific signal with sufficient signal strength is found, means for performing by the UE idle handoff (HO) for the femto cell; and
   when no cell-specific signal with sufficient signal strength is found, means for tuning the UE to the macro cell frequency, $F_M$.

19. The apparatus of claim 18, further comprising:
   means for demodulating by the UE a femto cell paging channel;
   means for getting a femto cell system parameters message (SPM); and
   means for registering the UE on the femto cell.

20. The apparatus of claim 19, wherein means for demodulating further comprising:
   means for confirming parameters by the UE system ID, network ID and base ID;
   means for matching with system ID for the femto cell, with the network ID for the femto cell, and base ID broadcast in the femto cell SPM; and
   when confirmation fails, means for attempting to register on the femto cell to determine when the UE is allowed to access the femto cell.

21. A method for a user equipment (UE) to locate a femto cell, the method comprising:

determining, by the UE, when the UE is in a low mobility status, wherein a degree of mobility is evaluated by estimating total pilot phase excursions over a period of time;

tuning to a frequency where femto cells are deployed;

taking a signal sample, wherein samples taken for targeted search are reused to find new femto cells;

conducting a search for all cell-specific signals reserved to femto cell use;

finding the femto cell;

determining, by the UE, when the femto cell is authorized to use;

when the femto cell is authorized to use, registering the UE on the femto cell; and when the femto cell is not authorized to use, returning to monitor a macro system.

22. The method of claim 21, wherein the UE uses pilot phase deviations of a plurality of macro cells to evaluate the degree of mobility.

23. The method of claim 21, wherein the UE searches for pilots in a neighbor list from macro cells, gets raw information about the pilot phases, based on which the UE determines the degree of mobility.

24. The method of claim 21, wherein the UE takes samples without losing pages on the macro system that the UE monitors.

25. An apparatus to locate a femto cell, comprising:
means for determining by a user equipment (UE) when the UE is in a low mobility status, wherein a degree of mobility is evaluated by estimating total pilot phase excursions over a period of time;

means for tuning to a frequency where femto cells are deployed, wherein the means for tuning comprises hardware;

means for taking a signal sample, wherein samples taken for targeted search are reused to find new femto cells;

means for conducting a search for all cell-specific signals reserved to femto cell use;

means for finding the femto cell;

means for determining by the UE when the femto cell is authorized to use;

when the femto cell is authorized to use, means for registering the UE on the femto cell; and when the femto cell is not authorized to use, means for returning to monitor a macro system.

26. The apparatus of claim 25, wherein the UE uses pilot phase deviations of a plurality of macro cells to evaluate the degree of mobility.

27. The apparatus of claim 25, wherein the UE searches for pilots in a neighbor list from macro cells, gets raw information about the pilot phases, based on which the UE determines the degree of mobility.

28. The apparatus of claim 25, wherein the UE takes samples without losing pages on the macro system that the UE monitors.

29. A non-transitory computer-readable medium comprising codes for causing a computer to:

determine by a user equipment (UE) when the UE is in a low mobility status, wherein a degree of mobility is evaluated by estimating total pilot phase excursions over a period of time;

tune to a frequency where femto cells are deployed;

take a signal sample, wherein samples taken for targeted search are reused to find new femto cells;

conduct a search for all cell-specific signals reserved to femto cell use;

find a femto cell;

determine by the UE when the femto cell is authorized to use;

when the femto cell is authorized to use, registering the UE on the femto cell; and when the femto cell is not authorized to use, returning to monitor a macro system.

30. The non-transitory computer-readable medium of claim 29, wherein the UE uses pilot phase deviations of a plurality of macro cells to evaluate the degree of mobility.

31. The non-transitory computer-readable medium of claim 29, further comprising codes for causing a computer to:
search for pilots in a neighbor list from macro cells, get raw information about the pilot phases, based on which the UE determines the degree of mobility.

32. The non-transitory computer-readable medium of claim 29, further comprising codes for causing a computer to take samples without losing pages on the macro system that the UE monitors.

33. A user equipment (UE) comprising:
a processor that determines when the UE is in a low mobility status, wherein a degree of mobility is evaluated by estimating total pilot phase excursions over a period of time;

receiver that tunes to a frequency where femto cells are deployed, wherein the receiver comprises hardware;

said processor takes a signal sample, conducts a search for all cell-specific signals reserved to femto cell use, finds a femto cell, and determines when the femto cell is authorized to use, wherein samples taken for targeted search are reused to find new femto cells;

when the femto cell is authorized to use, registers itself on the femto cell; and when the femto cell is not authorized to use, returns to monitor a macro system.

34. The UE of claim 33, wherein the UE uses pilot phase deviations of a plurality of macro cells to evaluate the degree of mobility.

35. The UE of claim 33, wherein the UE searches for pilots in a neighbor list from macro cells, gets raw information about the pilot phases, based on which the UE determines the degree of mobility.

36. The UE of claim 33, wherein the UE takes samples without losing pages on the macro system that the UE monitors.

* * * * *